United States Patent
Yaney et al.

(10) Patent No.: US 11,472,365 B1
(45) Date of Patent: Oct. 18, 2022

(54) FRONTAL AIRBAG SYSTEMS WITH DEPLOYMENT-ASSISTING WRAPPER

(71) Applicant: Autoliv ASP, Inc., Odgen, UT (US)

(72) Inventors: Joel Yaney, Macomb, MI (US); Don Heydens, Rochester Hills, MI (US); Mark Olson, Farmington Hills, MI (US); Andrew Fisher, Ortonville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/342,361

(22) Filed: Jun. 8, 2021

(51) Int. Cl.
| | |
|---|---|
| *B60R 21/205* | (2011.01) |
| *B60R 21/2342* | (2011.01) |
| *B60R 21/201* | (2011.01) |
| *B60R 21/215* | (2011.01) |
| *B60R 21/237* | (2006.01) |

(52) U.S. Cl.
CPC .......... *B60R 21/215* (2013.01); *B60R 21/201* (2013.01); *B60R 21/205* (2013.01); *B60R 21/237* (2013.01); *B60R 21/2342* (2013.01); *B60R 2021/21537* (2013.01)

(58) Field of Classification Search
CPC . B60R 21/2176; B60R 21/215; B60R 21/205; B60R 21/2342; B60R 21/237; B60R 21/201; B60R 21/206; B60R 21/2165; B60R 2021/21537
USPC .......................... 280/728.2, 728.3, 732, 743.2
See application file for complete search history.

(56) References Cited

U.S. PATENT DOCUMENTS

| | | | | |
|---|---|---|---|---|
| 5,626,358 A | * | 5/1997 | Ricks | B60R 21/23 200/61.54 |
| 5,727,812 A | * | 3/1998 | Dykstra | B60R 21/2035 200/61.54 |
| 6,131,944 A | * | 10/2000 | Henkel | B60R 21/16 280/732 |
| 7,793,978 B2 | * | 9/2010 | Vigeant | B60R 21/233 280/739 |
| 8,485,553 B1 | * | 7/2013 | Kuhne | B60R 21/205 280/743.2 |
| 8,596,679 B2 | * | 12/2013 | Horikawa | B60R 21/217 280/743.2 |
| 2003/0218323 A1 | * | 11/2003 | Berbalk | B60R 21/2171 280/743.1 |
| 2007/0057487 A1 | * | 3/2007 | Kim | B60R 21/201 280/743.2 |

(Continued)

FOREIGN PATENT DOCUMENTS

| | | | |
|---|---|---|---|
| CN | 208411661 U | * | 1/2019 |
| WO | WO-2021033487 A1 | * | 2/2021 |

*Primary Examiner* — Keith J Frisby
(74) *Attorney, Agent, or Firm* — Foley & Lardner LLP

(57) ABSTRACT

An inflatable airbag system is disclosed, the inflatable airbag system configured with a wrapper to facilitate an inflating airbag cushion to exit a housing of the inflatable airbag system. The inflatable airbag system may be mounted forward of an occupant of a vehicle, the inflatable airbag system disposed behind one or more panel doors, the panel doors each equipped with a hinge to facilitate opening of the panel doors without the panel doors detaching. The wrapper is configured to separate so as to form a ramp to cover each hinge of each panel door whereby the inflating airbag cushion is precluded from engaging the hinge, wherein such engagement may otherwise adversely alter an inflation rate or trajectory of the inflating airbag cushion.

19 Claims, 7 Drawing Sheets

(56) References Cited

U.S. PATENT DOCUMENTS

| | | | | |
|---|---|---|---|---|
| 2007/0120346 A1* | 5/2007 | Kwon | ................. | B60R 21/2165 |
| | | | | 280/743.2 |
| 2007/0138779 A1* | 6/2007 | Kwon | ................... | B60R 21/205 |
| | | | | 280/743.2 |
| 2009/0295136 A1* | 12/2009 | Kumagai | .............. | B60R 21/231 |
| | | | | 280/743.1 |
| 2010/0102541 A1* | 4/2010 | Shimizu | ................ | B60R 21/201 |
| | | | | 280/728.3 |
| 2010/0253055 A1* | 10/2010 | Schneider | ........... | B60R 21/2346 |
| | | | | 29/428 |
| 2011/0088356 A1* | 4/2011 | Lachat | .................. | B60R 21/237 |
| | | | | 53/482 |
| 2011/0193328 A1* | 8/2011 | Fukawatase | .......... | B60R 21/206 |
| | | | | 280/730.2 |
| 2018/0099637 A1* | 4/2018 | Choi | .................... | B60R 21/237 |

* cited by examiner

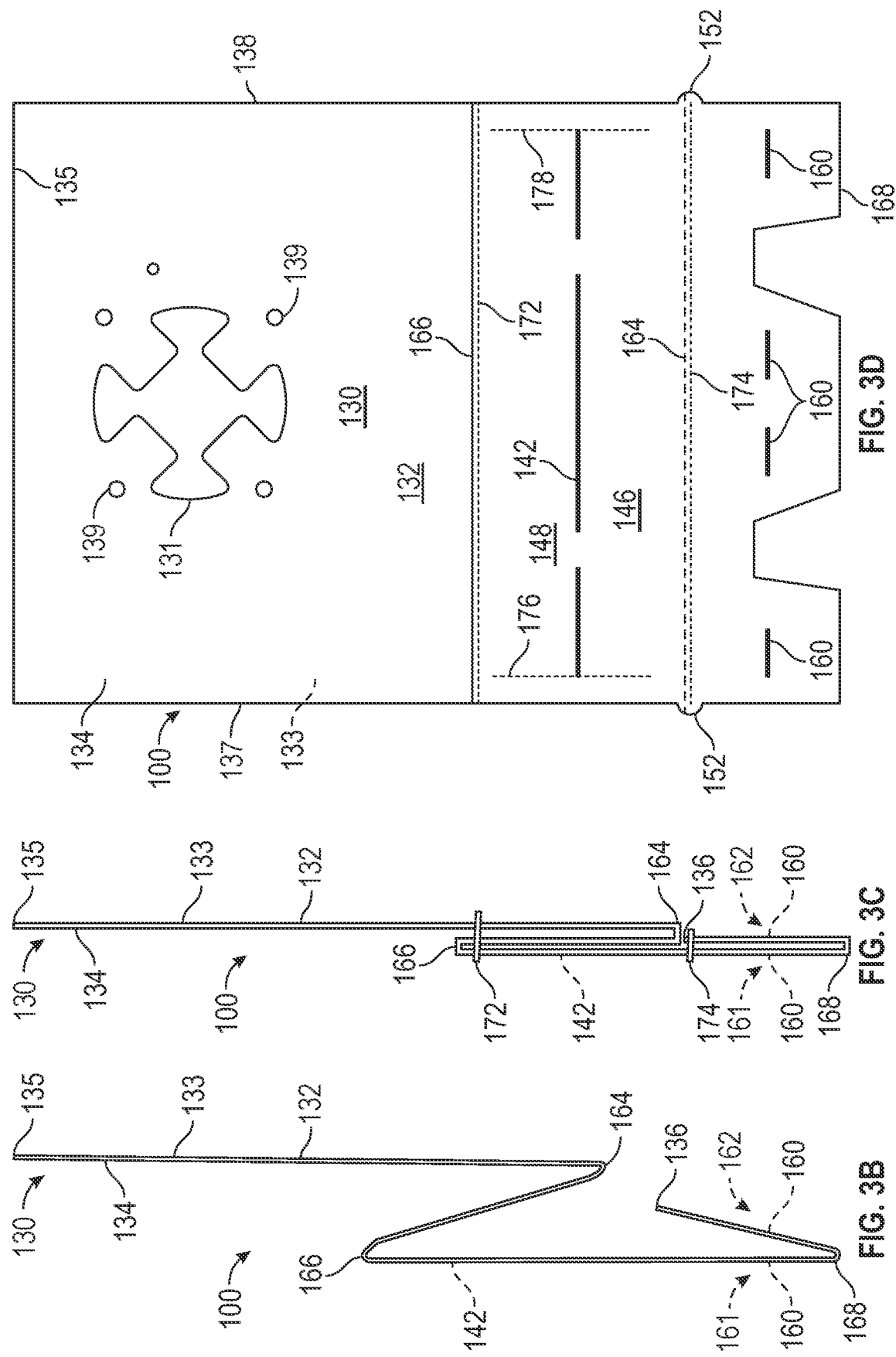

FRONTAL AIRBAG SYSTEMS WITH DEPLOYMENT-ASSISTING WRAPPER

TECHNICAL FIELD

The present disclosure relates generally to the field of automotive protective systems. More specifically, the present disclosure relates to frontal airbag systems that are configured to deploy in response to collision events.

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

BRIEF DESCRIPTION OF THE DRAWINGS

FIG. 3B is a side view of the wrapper of the inflatable airbag assembly of FIG. 3A illustrating folding of the wrapper during assembly.

FIG. 3C is a side view of the wrapper of the inflatable airbag assembly of FIGS. 3A-3B, showing the wrapper in a folded state.

FIG. 3D is a plan view of the wrapper of the inflatable airbag assembly of FIGS. 3A-3C illustrating the folded wrapper.

DETAILED DESCRIPTION

Figure 1:
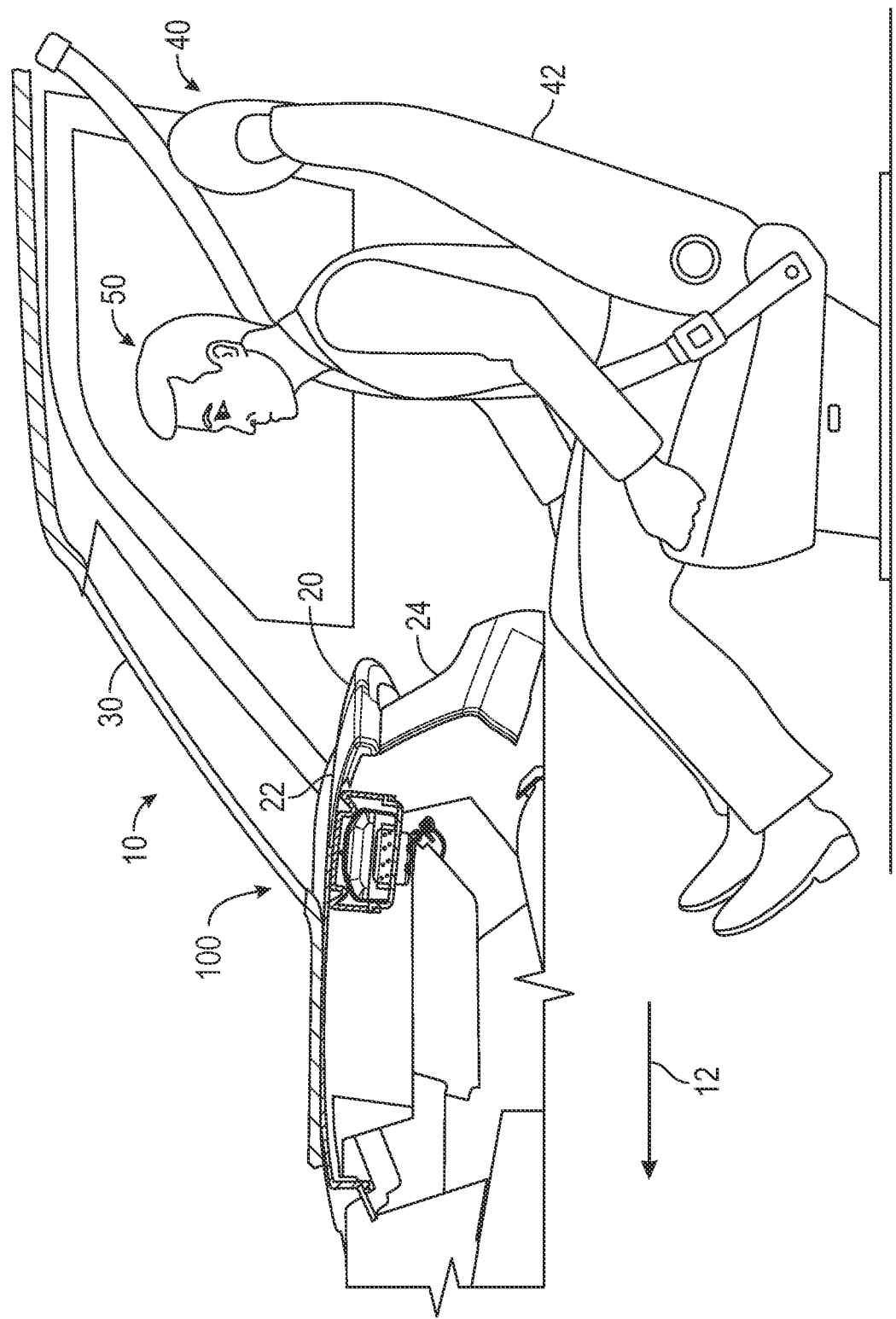
FIG. 1 is a side view of a portion of an interior of a vehicle wherein an inflatable airbag assembly is installed in an instrument panel, according to an embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within the dashboard, although the principles discussed may apply to other types of airbags (e.g., driver airbags housed within the steering wheel, knee airbags, and side airbags).

Front airbags are often installed in a steering wheel, dashboard, or instrument panel of a vehicle. As used herein, the terms "dashboard" and "instrument panel" refer to a rearward (relative to a front of a vehicle) protruding region of a vehicle faced by a motor vehicle occupant, which often includes a glove compartment in a portion thereof that faces a passenger and may include instruments (e.g., radio and/or climate controls) in a more central region thereof, although such instruments need not be present.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors. In some existent methods for installing an inflatable airbag assembly to a vehicle, a hinge of a closure behind which the inflatable airbag assembly is to be disposed, may impair deployment of an inflatable airbag cushion in a collision event. Other features (factory-installed or otherwise) disposed adjacent or near an inflatable airbag assembly may similarly impair deployment of an inflatable airbag cushion in response to a collision event.

Certain embodiments of airbag assemblies that are disclosed herein are particularly well suited for cushioning a front-seat passenger, and may be mounted in a dashboard. An airbag assembly can mitigate injury to an occupant of a vehicle during a collision event by reducing the effect of impact on the occupant against structures (body-structure impact) within the vehicle (such as, e.g., a dashboard, or door column, etc.). More particularly, embodiments of the present disclosure may reduce or eliminate impairment of deployment of an inflatable airbag cushion due to a hinge of a door-like structure of an airbag cover or other feature associated with, or disposed near, an inflatable airbag assembly.

FIG. 1 is a side view of a portion of an interior of a vehicle 10 wherein an inflatable airbag assembly 100, according to an embodiment of the present disclosure, is installed. A vehicle front direction 12 is shown for reference. The vehicle 10 comprises an instrument panel (dashboard) 20, a windshield 30, and an occupant position 40. The occupant position 40 comprises an occupant seat 42. An occupant 50 is shown in the occupant position 40 seated in the occupant seat 42. The instrument panel 20 comprises an upper aspect 22 and a rearward aspect 24. In the present embodiment, the inflatable airbag assembly 100 is installed below the upper aspect 22 of the instrument panel 20 and behind the rearward aspect 24 of the instrument panel 20. In one embodiment, the inflatable airbag assembly 100 is a passenger-side frontal airbag assembly configured to deploy through the upper aspect 22 of the instrument panel 20 of the vehicle 10. For simplicity, the inflatable airbag assembly 100 will be described as a passenger-side frontal airbag assembly, however, the inflatable airbag assembly 100 may be used in a number of different locations throughout the vehicle 10.

Figure 2:
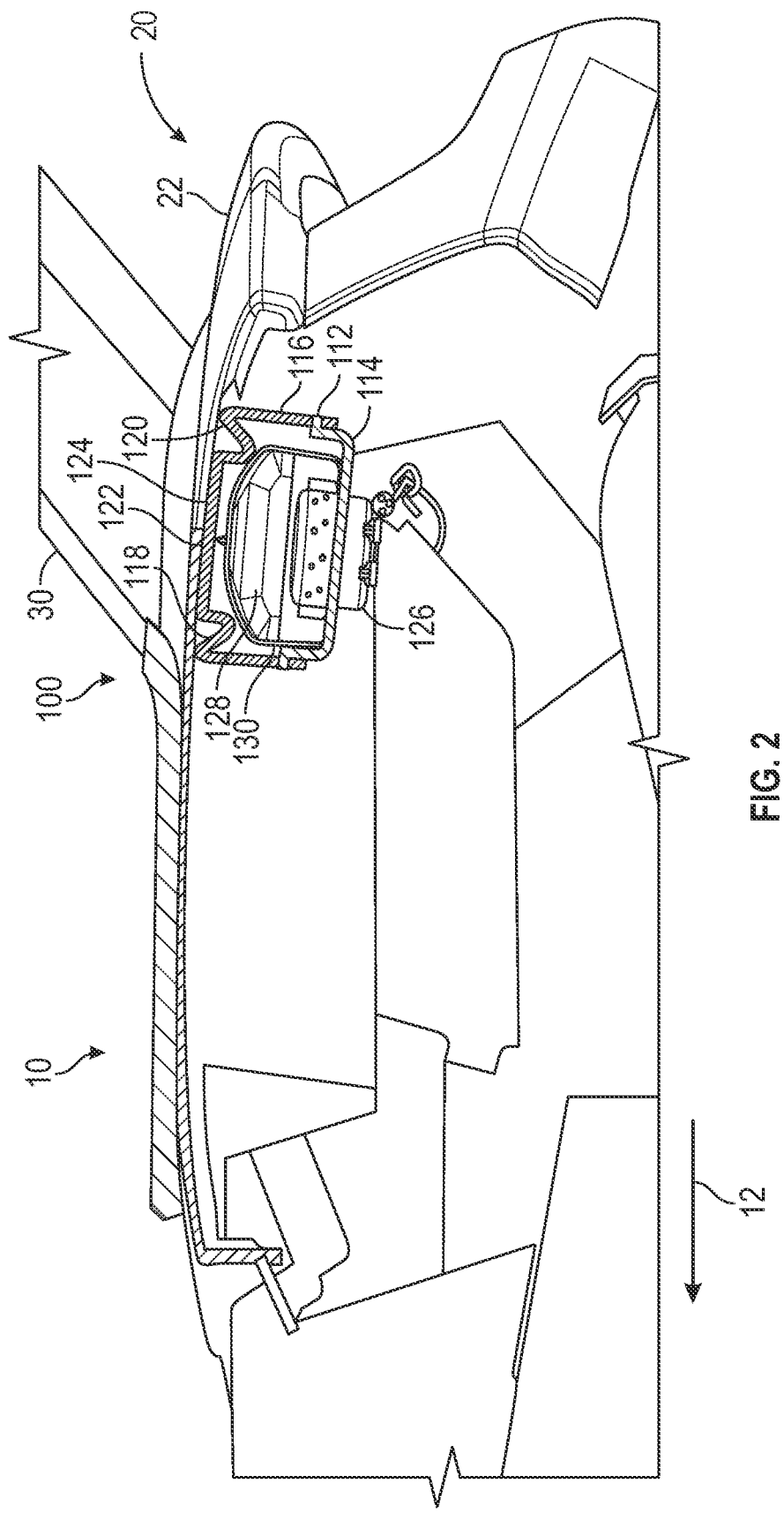
FIG. 2 is a detailed side view of the portion of the interior of the vehicle and the instrument panel of FIG. 1, wherein the inflatable airbag assembly is installed.

FIG. 2 is a more detailed side view of the portion of the interior of the vehicle 10 and the instrument panel 20. The vehicle front direction 12, the dashboard upper aspect 22, and the windshield 30 are shown for reference. The inflatable airbag assembly 100 comprises a housing 112, an inflator 126, and an inflatable airbag cushion 128. A wrapper 130 is disposed at least partially about the inflatable airbag cushion 128. In other words, the wrapper 130 may be configured to at least partially wrap around the inflatable airbag cushion 128 in an undeployed configuration. The wrapper 130 is further configured to release the inflatable airbag cushion 128 during deployment. The wrapper 130 is further described below with reference to FIGS. 3A-3D, et seq.

The housing 112 may be secured to a structure of the vehicle 10. For example, the housing 112 may be secured to the vehicle frame. In the illustrated embodiment of FIG. 2, the inflatable airbag cushion 128 is in an undeployed configuration, in which the airbag cushion 128 is in a storage or compact state. The airbag cushion 128 may be folded, rolled, or otherwise configured in the compact state and disposed within the housing 112. The inflatable airbag cushion 128 is configured to receive inflation gas from the inflator 126. The inflator 126 may be activated in the event of a collision event whereby the inflator 126 delivers inflation gas to the inflatable airbag cushion 128, causing the inflatable airbag cushion 128 to rapidly expand while deploying from the housing 112. The inflatable airbag cushion 128 may be disposed within the housing 112 and deployed through a pair of panel doors (covers 122, 124) in the instrument panel 20 of the vehicle 10 to provide cushioning restraint to an occupant during a collision event involving the vehicle. In some embodiments, the pair of panel doors are instrument panel doors.

The housing 112 comprises a lower housing 114 and an upper housing 116. The upper housing 116 further comprises a first hinge 118 and a second hinge 120. The first hinge 118 is coupled to a first cover 122 and the second hinge 120 is coupled to a second cover 124. In the illustrated embodiment, the first hinge 118 and the second hinge 120 are passive, meaning they are not supplied with power to operate. The first hinge 118 and the second hinge 120 keep the first cover 122 and the second cover 124, respectively, in a closed position until a collision event results in activation of the inflatable airbag assembly 100. When the inflatable airbag assembly 100 is activated, the first hinge 118 and the second hinge 120 may permit the first cover 122 and the second cover 124 to open away from the inflatable airbag assembly 100 to create an opening in the upper aspect 22 of the instrument panel 20 through which the inflatable airbag cushion 128 may deploy. Furthermore, the first hinge 118 and the second hinge 120 may be configured to retain the first cover 122 and the second cover 124. In other words, the first hinge 118 and the second hinge 120 may hold the first cover 122 and the second cover 124 closed until a collision event results in deployment of the inflatable airbag cushion 128 (by activation of the inflator 126) and then permit the first cover 122 and the second cover 124 to rotate upward and outward while maintaining the first cover 122 and second cover 124 coupled to the upper aspect 22 of the instrument panel 20, so that the first cover 122 and the second cover 124 do not become projectiles during deployment.

Figure 3A:
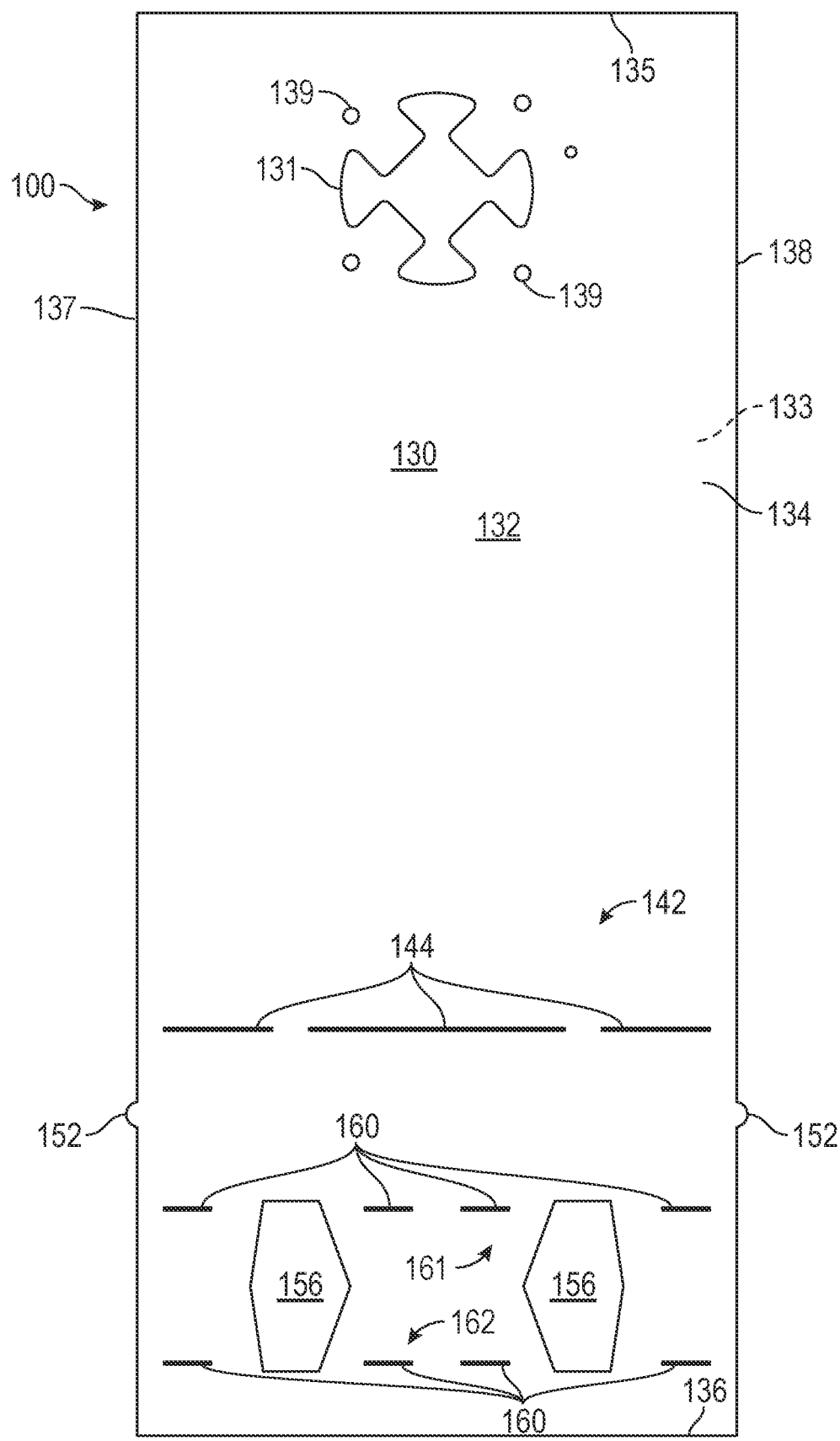
FIG. 3A is a plan view of a wrapper for an inflatable airbag assembly, according to an embodiment of the present disclosure.

FIG. 3A is a plan view of the wrapper 130, according to an embodiment of the present disclosure. The wrapper 130 may comprise a fabric panel 132 with an inner surface 133, an outer surface 134, a first edge 135, a second edge 136, a first lateral edge 137, and a second lateral edge 138. The fabric panel 132 may define an inflator aperture 131 configured to receive the inflator 126 (not shown in FIG. 3A, see FIG. 2). The inflator aperture 131 may be a predetermined distance from a first end (first edge 135) of the wrapper 130 that engages around the inflator to secure the wrapper 130 to the inflator 126. In other words, a portion of the inflator 126 may pass through the fabric panel 132 such that a portion of the inflator 126 may be disposed within the wrapper 130 when the inflatable airbag assembly 100 is fully assembled. Mounting of the inflator 126 to the lower housing 114 (not shown in FIG. 3A, see FIG. 2) may couple the wrapper 130 to the lower housing 114. The fabric panel 132 may be further configured with one or more mounting apertures 139. The mounting apertures 139 may be configured to receive or accommodate a mounting device (e.g., a mounting stud, etc.) to affix the wrapper 130 to the lower housing 114. The wrapper 130 further comprises a burst seam 142. The burst seam 142 may be a tear seam, series of slits or perforations (slits) 144, and the like. In other words, in one embodiment, the burst seam 142 of the wrapper 130 comprises a tear seam that extends laterally across the wrapper 130 from the first lateral edge 137 to the second lateral edge 138 and is configured to tear upon deployment, thereby separating the wrapper 130 into two portions. In one embodiment, the burst seam 142 comprises a series of slits 144 configured to cause the wrapper 130 to separate into two portions along a line generally aligned with the slits 144. The burst seam 142 is configured to maintain the wrapper 130 in one piece until the inflatable airbag cushion 128 begins to expand and deploy, whereby the slits 144 are configured to tear, thus enabling separation of the wrapper 130 into two portions to permit the inflatable airbag cushion 128 to exit from within the wrapper 130.

The fabric panel 132 may further comprise one or more tabs 152. In the illustrated embodiment, one tab 152 may be disposed on the first lateral edge 137 and another tab 152 may be disposed on the second lateral edge 138. The tabs 152 may facilitate manipulation of the fabric panel 132 and/or the wrapper 130 during assembly.

The fabric panel 132 may also comprise one or more closure cutouts 156. The fabric panel 132 may have a series of closure apertures 160. The wrapper 130 comprises a plurality of slits (closure apertures 160) that extend laterally in series from the first lateral edge 137 to the second lateral edge 138 a predetermined distance from the second end (second edge 136). The slits 160 are configured to attach to a plurality of hooks or tabs disposed on an edge of the housing 112. In the present embodiment, the closure apertures 160 are arranged in a first row 161 and a second row 162. The closure apertures 160 may take the form of slits cut into the fabric panel 132.

Figure 5:
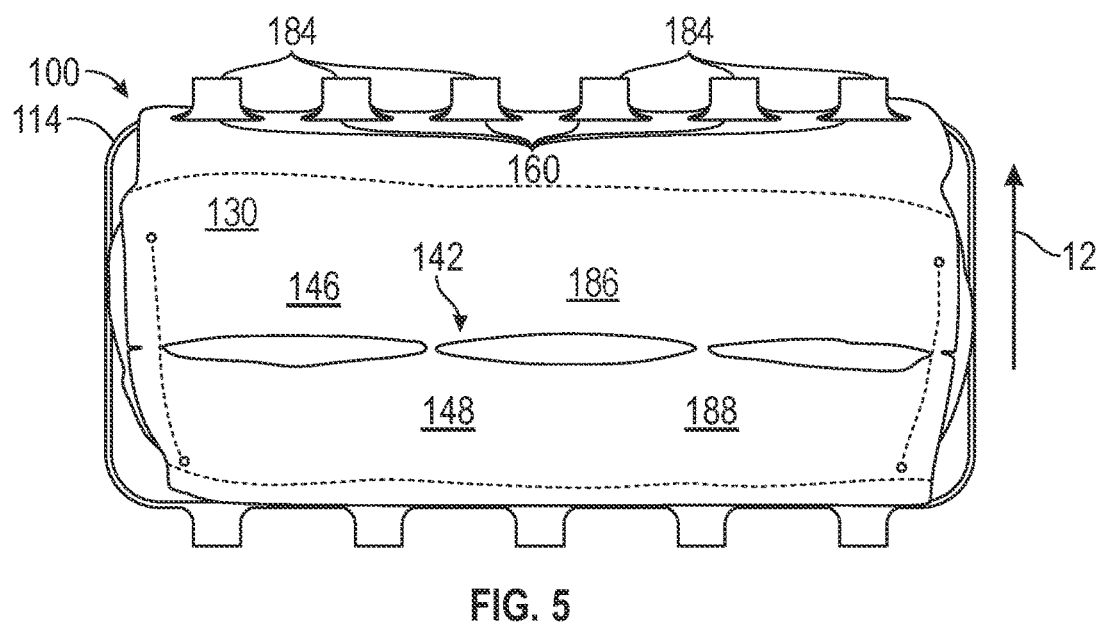
FIG. 5 is a top view of the inflatable airbag assembly of FIG. 4 at a stage of assembly subsequent to that shown in FIG. 4.

FIG. 3B is a side view of the wrapper 130 of the inflatable airbag assembly 100 of FIG. 3A during folding of the fabric panel 132 during assembly. The inner surface 133 and outer surface 134, as well as the first edge 135 and second edge 136 are identified for reference. A first fold 164, a second fold 166, and a third fold 168 are applied to the fabric panel 132. The first and second folds 164, 166 may configure the fabric panel 132 to dispose the burst seam 142 at an outward aspect of the wrapper 130 (as shown in FIG. 5) and, more particularly, at an outward layer of a plurality of layers of the fabric panel 132.

The third fold 168 may configure the fabric panel 132 such that the first row 161 and second row 162 of closure apertures 160 are aligned, and the fabric panel 132 is doubled in the region of the closure apertures 160. The fabric panel 132 is folded back on itself at the third fold 168 and near the second edge 136 to create two layers. The two layers are coupled together by a second lateral seam 174 (e.g., a second end portion stitch near the second edge 136 of the fabric panel 132) that extends laterally from the first lateral edge 137 to the second lateral edge 138. The second lateral seam 174 may correspond to the tabs 152 to align the second end portion stitch 174. The second lateral seam 174 is a secure stitch configured to withstand deployment of the inflatable airbag cushion 128. The second lateral seam 174 is disposed a predetermined distance from the second edge 136 of the fabric panel 132 with the plurality of slits (closure apertures 160), with the plurality of closure apertures 160 disposed between the stitch and the second end. Doubling the fabric panel 132 in the region of the closure apertures 160 may provide reinforcement to retain the closure apertures 160 in a fixed position relative to the housing 112 during deployment of the inflatable airbag cushion 128.

FIG. 3C is a side view of the wrapper 130 of the inflatable airbag assembly 100 of FIGS. 3A-3B, viewed from the same aspect shown in FIG. 3B, and showing the fabric panel 132 in a folded state. The inner surface 133, the outer surface 134, the first edge 135, and the second edge 136 are identified for reference. The burst seam 142 and the first and second rows 161, 162 of the closure apertures 160 are also shown for reference. The first, second, and third folds 164, 166, 168 are identified. A first lateral seam 172 (e.g., a reinforced portion stitch) that extends from the first lateral edge 137 to the second lateral edge 138 is applied near the second fold 166 to be disposed between the second fold 166 and the burst seam 142, whereby the first lateral seam 172 couples together three layers of the fabric panel 132.

The second lateral seam 174 extends from the first lateral edge 137 to the second lateral edge 138 and is applied near the tabs 152. The second lateral seam 174 couples together two layers of the fabric panel 132. In combination, the first and second lateral seams 172, 174, and the first and the second folds 164, 166 define a reinforced portion of the wrapper 130. The reinforced portion of the wrapper 130 comprises a z-fold, with the fabric panel 132 of the wrapper 130 folding back on itself twice to create three layers. The three layers of the reinforced portion are coupled together by the first lateral seam 172 (the reinforced portion stitch) that extends laterally from the first lateral edge 137 of the fabric panel 132 to the second lateral edge 138 of the fabric panel 132. The first lateral seam 172 is a secure stitch configured to withstand deployment. The first lateral seam 172 is disposed a predetermined distance from the first edge 135 of the fabric panel. Due to the arrangement of the first, second, and third folds 164, 166, 168, only one layer of the plurality of layers of the fabric panel 132 is common to both the first and second seams 172, 174, and the burst seam 142 is within that common layer.

FIG. 3D is a plan view of the wrapper 130 of the inflatable airbag assembly 100 of FIGS. 3A-3C, and illustrating the folded fabric panel 132. The inner surface 133, the outer surface 134, the first edge 135 of the fabric panel 132, and the tabs 152 are shown for reference. The inflator aperture 131, the mounting apertures 139, the closure apertures 160, and the first, second, and third folds 164, 166, 168 are identified. The first and second lateral seams 172, 174 are shown. The burst seam 142 defines a first portion 146 of the wrapper 130, and a second portion 148 of the wrapper 130. The first portion 146 extends from the first edge 135 to the burst seam 142. The second portion 148 extends from the second edge 136 to the burst seam 142. When the burst seam 142 tears, the wrapper 130 is separated into the first portion 146 and the second portion 148.

The wrapper 130 may also comprise a first end portion, a second end portion, and the reinforced portion previously discussed. As discussed above, the reinforced portion is a section of the wrapper 130 that comprises three layers. The first portion is a portion of the wrapper 130 between the reinforced portion and the first edge 135. The second end portion is a portion of the wrapper 130 between the reinforced portion and the second edge 136. Thus, the reinforced portion of the wrapper 130 is disposed between the first and second portions of the wrapper 130.

The reinforced portion of the wrapper 130 may comprise a first and a second longitudinal seam 176, 178. The longitudinal seams 176, 178 may be applied near the first lateral edge 137 and the second lateral edge 138 of fabric panel 132. The first and second longitudinal seams 176, 178 couple the three layers of the reinforced portion of the wrapper 130 together. The first and second longitudinal seams 176, 178 each comprise a tack stitch. A tack stitch is a stitch that is configured to break upon deployment of the inflatable airbag cushion 128. The first and second longitudinal seams 176, 178 may be sewn through all layers of the fabric panel 132. The first and second longitudinal seams 176, 178 may be applied across the burst seam 142, or may be adjacent the burst seam 142. In some embodiments, the length of the first and second longitudinal seams 176, 178 may extend the length of the reinforced portion. The first and second longitudinal seams 176, 178 may be configured to keep the three layers together during the assembly of the inflatable airbag assembly 100 as they break during deployment.

In the illustrated embodiment, the reinforced portion of the wrapper 130, by virtue of the folds 164, 166 comprises three layers of the fabric panel 132. In some embodiments, the reinforced portion may comprise more or less than three layers, for example two layers, or four or more layers. The reinforced portion of the first portion 146 may be configured to cover one of the hinges 118, 120 of one of the covers 122, 124 to limit engagement of the inflatable airbag cushion 128 with the hinges 118, 120 while the inflatable airbag cushion 128 deploys.

The burst seam 142 is configured to separate during inflation of the inflatable airbag cushion 128. Upon separation of the burst seam 142, the first and second longitudinal seams 176, 178 may each divide into two seam segments, wherein each seam segment conforms to the particular first or second portions 146, 148 of the wrapper 130. The first lateral seam 172 and the relevant segments of the first and second longitudinal seams 176, 178 may stabilize or strengthen the second portion 148 of the wrapper 130 by retaining the plurality of layers of the fabric panel 132 relative to each other and to the first lateral seam 172. The second lateral seam 174 and the relevant segments of the first and second longitudinal seams 176, 178 may similarly stabilize or strengthen the first portion 146 of the wrapper 130 by retaining the plurality of layers of the fabric panel 132 relative to each other and the closure apertures 160.

Figure 4:
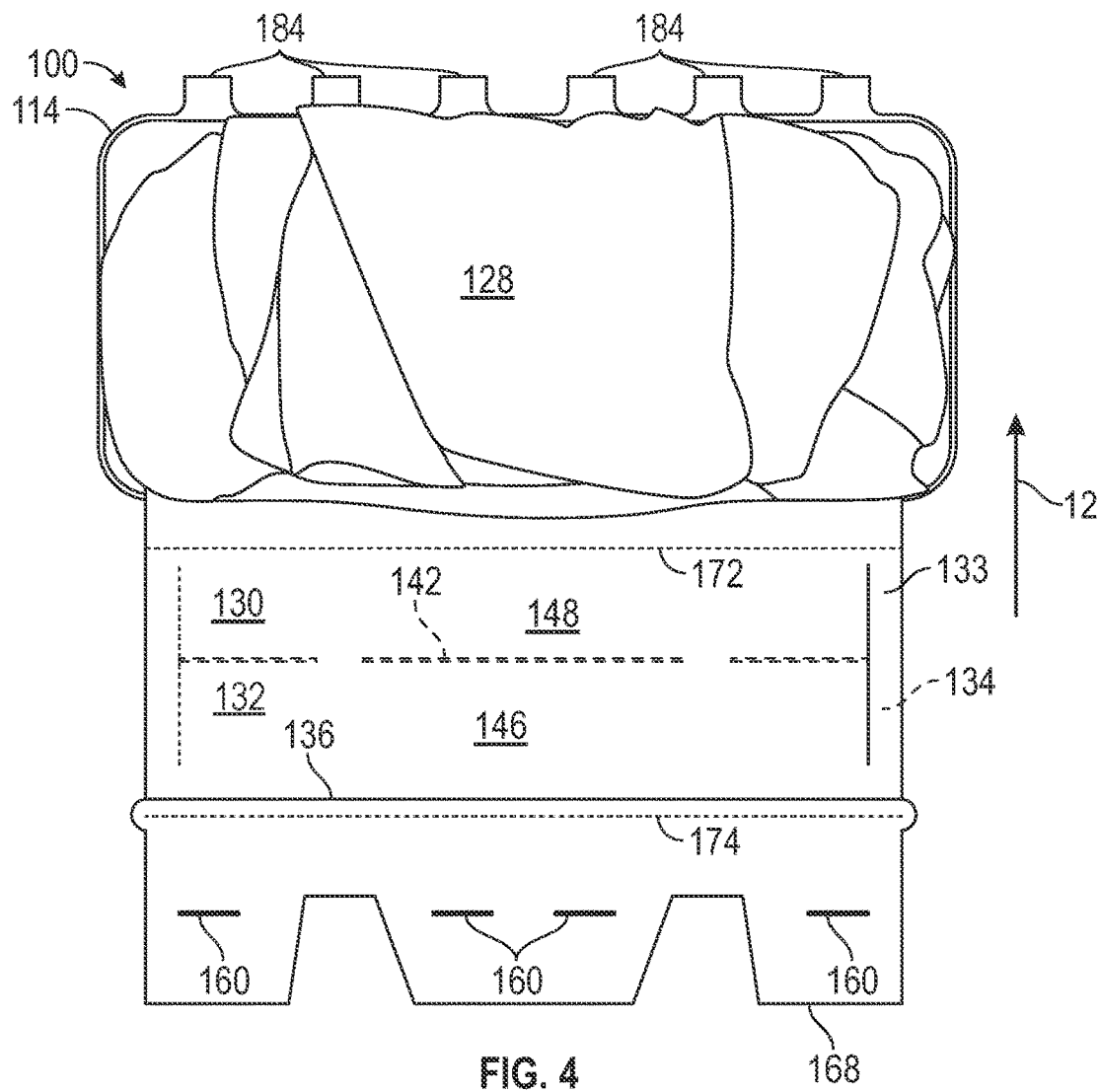
FIG. 4 is a top view of an inflatable airbag assembly in a partially assembled state, according to an embodiment of the present disclosure.

FIG. 4 is a top view of the inflatable airbag assembly 100 in a partially assembled state. The vehicle forward direction 12 is indicated as a reference. In the illustrated stage of assembly, the wrapper 130 has been coupled to the inflator 126 (not shown in FIG. 4, see FIG. 2), and the inflator and the wrapper 130 have been coupled to the lower housing 114. The inflatable airbag cushion 128 may be folded, rolled, or otherwise formed into a compact state and disposed in the lower housing 114 and atop or adjacent the inflator 126 and the wrapper 130. The inner surface 133, the outer surface 134, and the second edge 136 of the fabric panel 132 are shown for reference. The first and second lateral seams 172, 174, and the first portion 146 and the second portion 148 of the wrapper 130 are identified. The burst seam 142 is also identified. The lower housing 114 comprises a plurality of mounting tabs 184. The mounting tabs 184 may serve to couple the closure apertures 160 to the lower housing 114.

FIG. 5 is a top view of the inflatable airbag assembly 100 at a stage of assembly subsequent to that shown in FIG. 4. The vehicle forward direction 12 is shown for reference. The closure apertures 160 are coupled to the mounting tabs 184 of the lower housing 114. The burst seam 142 is shown, as are the first portion 146 and the second portion 148 of the wrapper 130. The first portion 146 of the wrapper 130 comprises a first ramp 186 or is otherwise configured to form the first ramp 186. The second portion 148 of the wrapper 130 comprises a second ramp 188 or is otherwise configured to form the second ramp 188. In other words, the first and second portions 146, 148 of the wrapper 130, during deployment of the inflatable airbag cushion 128, is configured to create ramps 186, 188 over one of the hinges 118, 120 to enable the inflatable airbag cushion 128 to slide along the wrapper 130 and prevent the inflatable airbag cushion 128 from directly engaging the hinges 118, 120. The first and second ramps 186, 188 are more thoroughly described in conjunction with FIG. 7.

Figure 6:
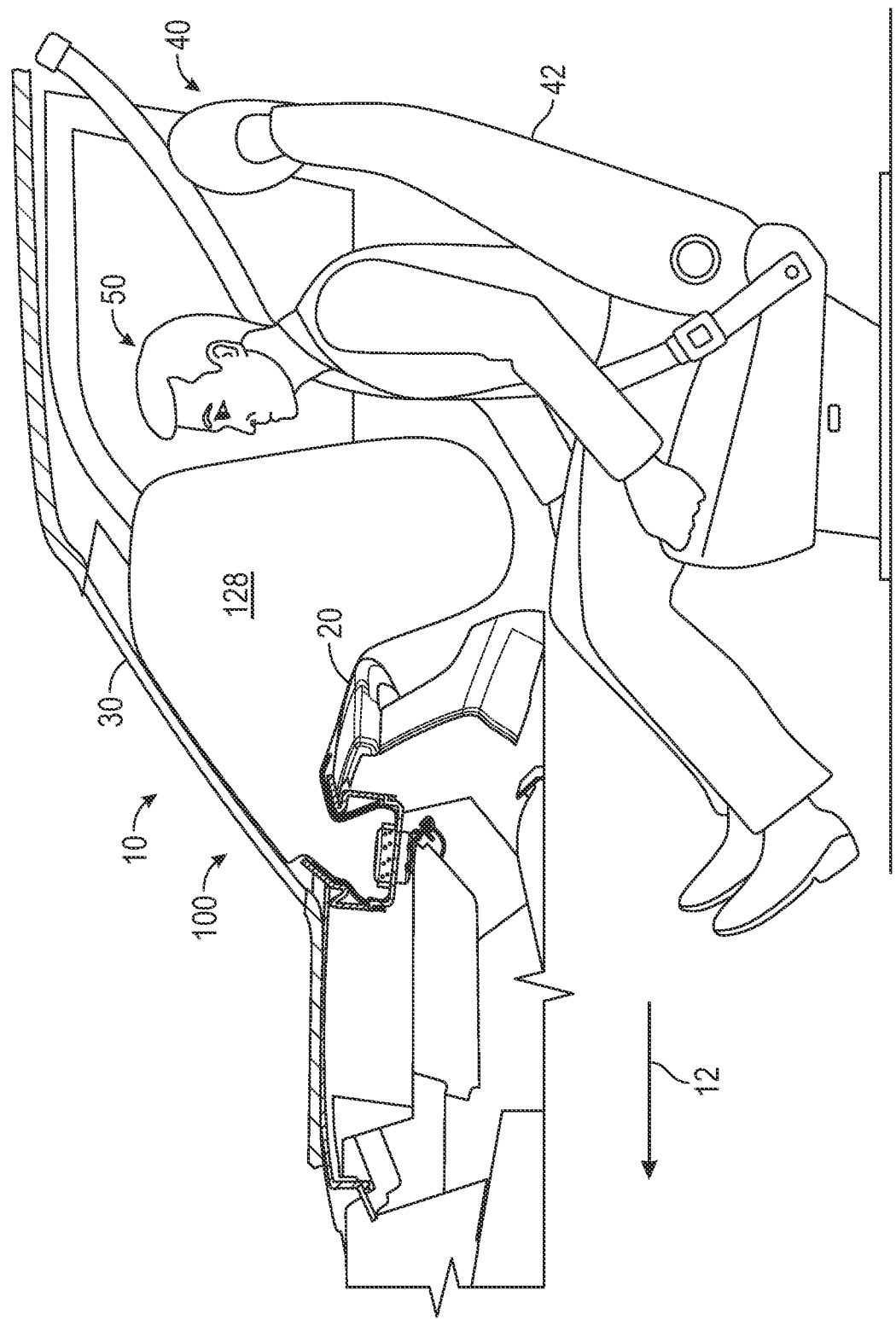
FIG. 6 is a partial sectional side view of a portion of an interior of a vehicle with an inflatable airbag cushion of an inflatable airbag assembly in a deployed and at least partially inflated state, according to an embodiment of the present disclosure.

FIG. 6 is a side view of a portion of the vehicle 10 of FIG. 1, having the inflatable airbag assembly 100 with the inflatable airbag cushion 128 in a deployed and at least partially inflated state. The instrument panel 20 and the windshield 30 are shown, as are the occupant position 40, the occupant seat 42, and an occupant 50. The inflatable airbag cushion 128 may be configured to be deployed as a result of a collision event. The inflatable airbag cushion 128 may be configured to be disposed forward of the occupant 50. In one embodiment, the inflatable airbag cushion 128 may employ a portion of the windshield 30 to assist in disposing the inflatable airbag cushion 128 in a preferred position forward of the occupant 50. In one embodiment, the inflatable airbag cushion 128 may be configured to employ a portion of the dashboard 20 to assist in disposing the inflatable airbag cushion 128 in a preferred position forward of the occupant 50.

Figure 7:
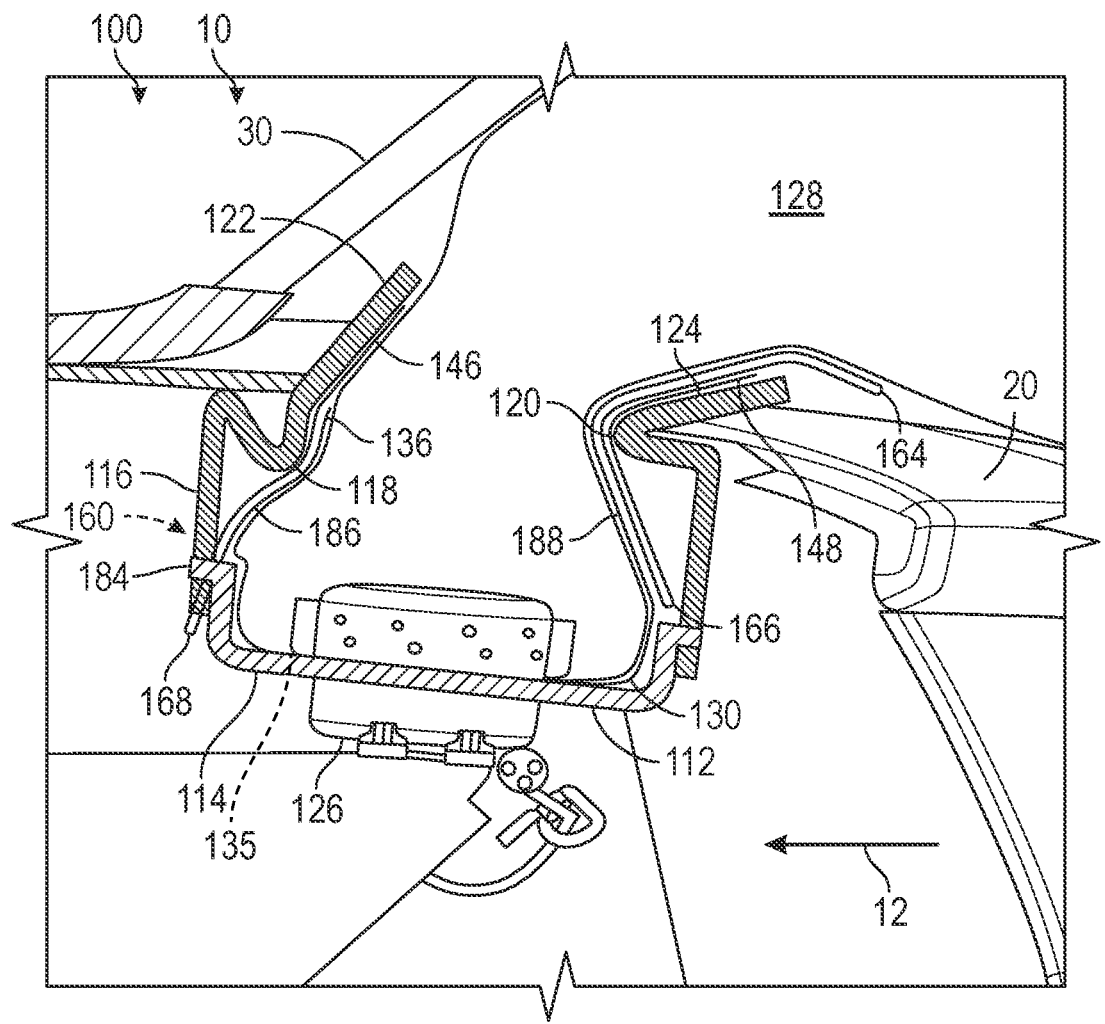
FIG. 7 is an enlarged side view of a portion of the inflatable airbag assembly of FIG. 6 with the inflatable airbag cushion in a deployed and at least partially inflated state.

FIG. 7 is a detailed side view of a portion of the inflatable airbag assembly 100 with the inflatable airbag cushion 128 in a deployed and at least partially inflated state. The instrument panel 20 and the windshield 30 of the vehicle 10 are shown, as is the vehicle forward direction 12. The inflator 126 is also shown. The inflatable airbag cushion 128 is shown in a deployed and at least partially inflated state.

During assembly, the upper housing 116 and lower housing 114 were coupled together to form the housing 112 of the inflatable airbag assembly 100.

Prior to deployment, the inflatable airbag cushion 128 is in a folded, rolled, or otherwise compressed and compact state, as shown in FIGS. 1 and 2. The first cover 122 and the second cover 124 are in a closed position over the inflatable airbag cushion 128, as shown in FIGS. 1 and 2. Deployment of the inflatable airbag cushion 128 may be initiated as a result of a collision event. Initiation of the deployment of the inflatable airbag cushion 128 comprises the inflator 126 activating and rapidly delivering inflation gas to the inflatable airbag cushion 128, causing the inflatable airbag cushion 128 to rapidly expand. Expansion of the inflatable airbag cushion 128 causes upward movement of the inflatable airbag cushion 128, relative to the vehicle 10. As the inflatable airbag cushion 128 expands and moves upwards, the burst seam 142 ruptures and the first and second covers 122, 124 open away from the inflatable airbag cushion 128 as the inflatable airbag cushion 128 impacts the first and second covers 122, 124. The first and second hinges 118, 120 may articulate to facilitate movement of the first and second covers 122, 124. Without the wrapper 130 of the present disclosure, the first hinge 118, the second hinge 120, or both hinges 118, 120 may interfere with expansion and deployment of the inflatable airbag cushion 128, whereby the inflatable airbag cushion 128 may fail to afford the occupant the intended protection. Such failure may arise from the inflatable airbag cushion 128 being improperly positioned due to one or both hinges 118, 120, the inflatable airbag cushion 128 being improperly inflated, the inflatable airbag cushion 128 engaging with the hinges 118, 120 during deployment, etc. With the wrapper 130 of the present disclosure, such deficiencies may be avoided or overcome.

With the closure apertures 160 coupled to the mounting tabs 184 of the lower housing 114, the third fold 168 of the wrapper 130 may be disposed at an exterior area of the housing 112. The closure apertures 160 anchor the first portion 146 of the wrapper 130 at the mounting tabs 184, whereby the first ramp 186 is disposed across the first hinge 118. The second edge 136 of the wrapper 130 is shown near the first hinge 118. The first portion 146 of the wrapper 130 and a portion of the wrapper 130 adjacent the second edge 136 of the wrapper 130 define the first ramp 186. With the first ramp 186 comprising a plurality of fabric layers that are coupled together by a plurality of seams, the first ramp 186 may be configured to substantially support the inflatable airbag cushion 128 such that the inflatable airbag cushion 128 is not impeded, deformed, or otherwise affected by the first hinge 118. The plurality of fabric layers provide a stiffness or rigidity to the wrapper 130 that facilitates creation of the first ramp 186 over the first hinge 118. Stated otherwise, the plurality of fabric layers provide a stiffness or rigidity to the wrapper 130 that may allow the wrapper 130 to avoid catching and/or bunching at the first hinge 118 and thereby form the first ramp 186. The first ramp 186 enables the inflatable airbag cushion 128 to slide along the wrapper 130 and prevent the inflatable airbag cushion 128 from directly engaging the first hinge 118.

The first edge 135 of the wrapper 130 is disposed adjacent a lower portion of the lower housing 114, with the wrapper 130 passing between the inflator 126 and the lower housing 114. A portion of the wrapper 130 disposed adjacent a lower portion of the lower housing 114 may be coupled to and anchored at the lower housing 114 by one or more of the inflator 126 and mounting devices, such as, e.g., mounting studs, bolts, etc. The first fold 164 and the second fold 166 of the wrapper 130 are shown. In combination, the first and second folds 164, 166 define the second ramp 188. The second ramp 188 may be substantially contiguous with the second portion 148 of the wrapper 130, and comprises a plurality of fabric layers, as described in conjunction with FIGS. 3A-3D. The plurality of fabric layers provide a stiffness or rigidity to the reinforced portion of the wrapper 130 that facilitates creation of the second ramp 188 over the second hinge 120. Stated otherwise, the plurality of fabric layers at the reinforced portion of the wrapper 130 may provide a stiffness or rigidity to the wrapper 130 that can limit the wrapper 130 from catching and/or bunching at the second hinge 120 and thereby form the second ramp 188 over the second hinge 120. The second ramp 188 enables the inflatable airbag cushion 128 to slide along the wrapper 130 to prevent the inflatable airbag cushion 128 from directly engaging the second hinge 120. The second ramp 188, during deployment of the inflatable airbag cushion 128, may be disposed across or cover the second hinge 120, and may substantially support the inflatable airbag cushion 128 such that the inflatable airbag cushion 128 is not impeded, deformed, or otherwise affected by the second hinge.

Stated otherwise, both the first ramp 186 and the second ramp 188 may function as ramps to occlude the first and second hinges 118, 120 and prevent the hinges 118, 120 from interfering with deployment of the inflatable airbag cushion 128, whereby the inflatable airbag cushion 128 may deploy, expand, and inflate as intended to afford protection for the occupant during a collision event. In still other words, the first and second ramps 186, 188 may provide a relatively smooth exit trajectory for the inflatable airbag cushion 128 to exit the housing 112 without interference from the first hinge 118, the second hinge 120, or both. The first and second ramps 186, 188 may be configured to limit or prevent the inflatable airbag cushion 128 from catching on the hinges 118, 120 during deployment through the covers 122, 124. A first portion of the wrapper 130, defined by the first portion 146, covers the first hinge 118 of the first cover 122, and a second portion of the wrapper 130, defined by the second portion 148, covers the second hinge 120 of the second cover 124.

While the present embodiment involves deployment of the inflatable airbag cushion through a pair of panel doors (covers), the present disclosure anticipates deploying an inflatable airbag cushion through a different number of panel doors (covers), e.g., through a single door, through a compound door, through a three-door configuration, etc.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The phrases "attached to" or "attached directly to" refer to interaction between two or more entities which are in direct contact with each other and/or are separated from each other only by a fastener of any suitable variety (e.g., mounting hardware or an adhesive).

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "occupant position" refers to the position in which an occupant is generally positioned when in a vehicle. The term "occupant" refers to a person or crash test dummy within a vehicle.

The phrase "occupant seat" refers to a feature of an occupant position affording an occupant a means of being seated in the occupant position.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

It should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly comprising:
 a housing to be secured to a structure of a vehicle;
 an inflatable airbag cushion disposed within the housing and configured to deploy through a pair of panel doors;
 an inflator configured to provide inflation gas to the inflatable airbag cushion during deployment; and
 a wrapper comprising a first end, a second end, and a reinforced portion disposed between the first end and the second end and comprised of two or more layers, the wrapper to at least partially wrap around the inflatable airbag cushion in an undeployed configuration,
 wherein the wrapper is configured to release the inflatable airbag cushion during the deployment and the reinforced portion is configured to cover a hinge of one of the panel doors to limit engagement of the inflatable airbag cushion with the hinge while the inflatable airbag cushion deploys, wherein the inflatable airbag assembly is a passenger-side inflatable airbag assembly configured to deploy through an instrument panel of the vehicle.

2. The inflatable airbag assembly of claim 1, wherein the reinforced portion of the wrapper, during deployment of the inflatable airbag cushion, is configured to create a ramp over the hinge to enable the inflatable airbag cushion to slide along the wrapper and prevent the airbag cushion from directly engaging the hinge.

3. The inflatable airbag assembly of claim 2, wherein the ramp is configured to limit or prevent the inflatable airbag cushion from catching on the hinge during deployment.

4. The inflatable airbag assembly of claim 1, wherein the wrapper further comprises a tear seam that extends laterally across the wrapper from a first lateral edge to a second lateral edge and is configured to tear upon deployment, separating the wrapper into two portions.

5. The inflatable airbag assembly of claim 4, wherein a first portion of the wrapper covers a first hinge of the panel doors and a second portion of the wrapper covers a second hinge of the panel doors.

6. The inflatable airbag assembly of claim 1, wherein the wrapper comprises an inflator aperture a predetermined distance from the first end that engages around the inflator to secure the wrapper to the inflator.

7. The inflatable airbag assembly of claim 1, wherein the wrapper further comprises a plurality of slits that extend laterally in series from a first lateral edge to a second lateral edge a predetermined distance from the second end, and wherein the slits are configured to couple to a plurality of mounting tabs disposed on an edge of the housing.

8. The inflatable airbag assembly of claim 7, wherein a second end portion disposed near the second end of the wrapper is folded back on itself to create two layers, wherein the two layers are coupled together by a second end portion stitch that extends laterally from the first lateral edge to the second lateral edge, and wherein the second end portion stitch is disposed a predetermined distance from the second end with the plurality of slits disposed between the second end portion stitch and the second end.

9. The inflatable airbag assembly of claim 1, wherein the reinforced portion comprises a z-fold with the wrapper folding back on itself twice to create three layers.

10. The inflatable airbag assembly of claim 9, wherein the three layers of the reinforced portion are coupled together by a reinforced portion stitch that extends laterally from a first lateral edge to a second lateral edge, and wherein the reinforced portion stitch is disposed a predetermined distance from the first end.

11. The inflatable airbag assembly of claim 9, wherein the reinforced portion comprises a first longitudinal stitch disposed near a first lateral edge of the reinforced portion and a second longitudinal stitch disposed near a second lateral edge of the reinforced portion to couple the three layers of the reinforced portion together.

12. A wrapper for an inflatable airbag comprising:

a first end portion disposed at a first end of the wrapper;

a second end portion disposed at a second end of the wrapper; and a reinforced portion disposed between the first portion and the second portion, the reinforced portion comprising a z-fold with the wrapper folding back on itself twice to create three layers in the reinforced portion, wherein the three layers of the reinforced portion are coupled together by a reinforced portion stitch that extends laterally from a first lateral edge to a second lateral edge and that is a secure stitch configured to withstand deployment and maintain the z-fold through the deployment.

13. The wrapper of claim 12, wherein the reinforced portion comprises a first longitudinal stitch disposed near the first lateral edge and a second longitudinal stitch disposed near the second lateral edge to couple the three layers of the reinforced portion together, and wherein the first longitudinal stitch and the second longitudinal stitch extend a length of the reinforced portion.

14. The wrapper of claim 13, wherein the first longitudinal stitch and the second longitudinal stitch are tack stitches that are configured to break upon deployment.

15. The wrapper of claim 12, wherein the wrapper further comprises a tear seam that extends laterally across the reinforced portion from the first lateral edge to the second lateral edge and is configured to tear upon deployment of the inflatable airbag, separating the wrapper into two portions.

16. The wrapper of claim 12, further comprising an inflator aperture disposed in the first portion and configured to engage around the inflator to secure the wrapper to the inflator.

17. The wrapper of claim 12, further comprising a plurality of slits disposed in the second end portion that extend laterally in series from the first lateral edge to the second lateral edge a predetermined distance from the second end that are configured to attach to a plurality of hooks disposed on an edge of an airbag housing.

18. The wrapper of claim 17, wherein the second end portion is folded back on itself to create two layers, wherein the two layers are coupled together by a second end portion stitch that extends laterally from the first lateral edge to the second lateral edge and is configured to withstand deployment, and wherein the second end portion stitch is disposed a predetermined distance from the second end with the plurality of slits disposed between the second end portion stitch and the second end.

19. The wrapper of claim 18, wherein the plurality of slits is defined in both of the two layers of the second end portion.

* * * * *